United States Patent
Michael

(10) Patent No.: US 10,075,405 B2
(45) Date of Patent: Sep. 11, 2018

(54) COMPUTER MESSAGE INDICATOR

(71) Applicant: Johnny Michael, District Heights, MD (US)

(72) Inventor: Johnny Michael, District Heights, MD (US)

( * ) Notice: Subject to any disclaimer, the term of this patent is extended or adjusted under 35 U.S.C. 154(b) by 305 days.

(21) Appl. No.: 14/859,758

(22) Filed: Sep. 21, 2015

(65) Prior Publication Data

US 2017/0085513 A1    Mar. 23, 2017

(51) Int. Cl.
*H04L 12/58* (2006.01)
*F21V 21/00* (2006.01)
*F21V 33/00* (2006.01)
*H04N 7/14* (2006.01)

(52) U.S. Cl.
CPC ............. *H04L 51/24* (2013.01); *F21V 21/00* (2013.01); *F21V 33/00* (2013.01); *H04N 7/14* (2013.01)

(58) Field of Classification Search
CPC ............ F21V 21/00; F21V 33/00; H04N 7/14
See application file for complete search history.

(56) References Cited

U.S. PATENT DOCUMENTS

| | | |
|---|---|---|
| D418,240 S | 12/1999 | Sherman |
| 6,532,489 B1 | 3/2003 | Merchant |
| D525,116 S * | 7/2006 | Shyu .......................... D16/242 |
| 9,464,796 B2 * | 10/2016 | Shoemake .............. F21V 21/00 |
| 2002/0032020 A1 | 3/2002 | Brown et al. |
| 2003/0143983 A1 | 7/2003 | Crampton |
| 2003/0228003 A1 | 12/2003 | Vardon |
| 2007/0061403 A1 | 3/2007 | Seaburg |
| 2009/0322278 A1 * | 12/2009 | Franks ................. H02J 7/0045 320/107 |
| 2011/0248665 A1 * | 10/2011 | Smith .................. G03H 1/2294 320/101 |

FOREIGN PATENT DOCUMENTS

| | | | | |
|---|---|---|---|---|
| EP | 1069791 | * | 1/2001 | ............... H04Q 7/22 |
| WO | WO9903239 | * | 1/1999 | ............. H04L 12/58 |
| WO | WO2005089019 | | 9/2005 | |

* cited by examiner

*Primary Examiner* — Chirag R Patel

(57) ABSTRACT

A computer message indicator includes a computer including a screen for displaying images. The screen is bounded by a perimeter wall and the computer comprises a laptop computer. A control is in communication with the computer. A signal light is electrically coupled to the control and is mounted to the perimeter wall of the display. The control is signaled by the computer when the computer receives a message signal from the computer. The control is programmed to turn on the signal light when the control receives the message signal. The message signal is generated when the computer receives an incoming email, a video call, or an audio call.

1 Claim, 4 Drawing Sheets

COMPUTER MESSAGE INDICATOR

BACKGROUND OF THE DISCLOSURE

Field of the Disclosure

The disclosure relates to message signaling devices and more particularly pertains to a new message signaling device for signaling to a person that their computer has received an electronic message.

SUMMARY OF THE DISCLOSURE

An embodiment of the disclosure meets the needs presented above by generally comprising a computer including a screen for displaying images. The screen is bounded by a perimeter wall and the computer comprises a laptop computer. A control is in communication with the computer. A signal light is electrically coupled to the control and is mounted to the perimeter wall of the display. The control is signaled by the computer when the computer receives a message signal from the computer. The control is programmed to turn on the signal light when the control receives the message signal. The message signal is generated when the computer receives an incoming email, a video call, or an audio call.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
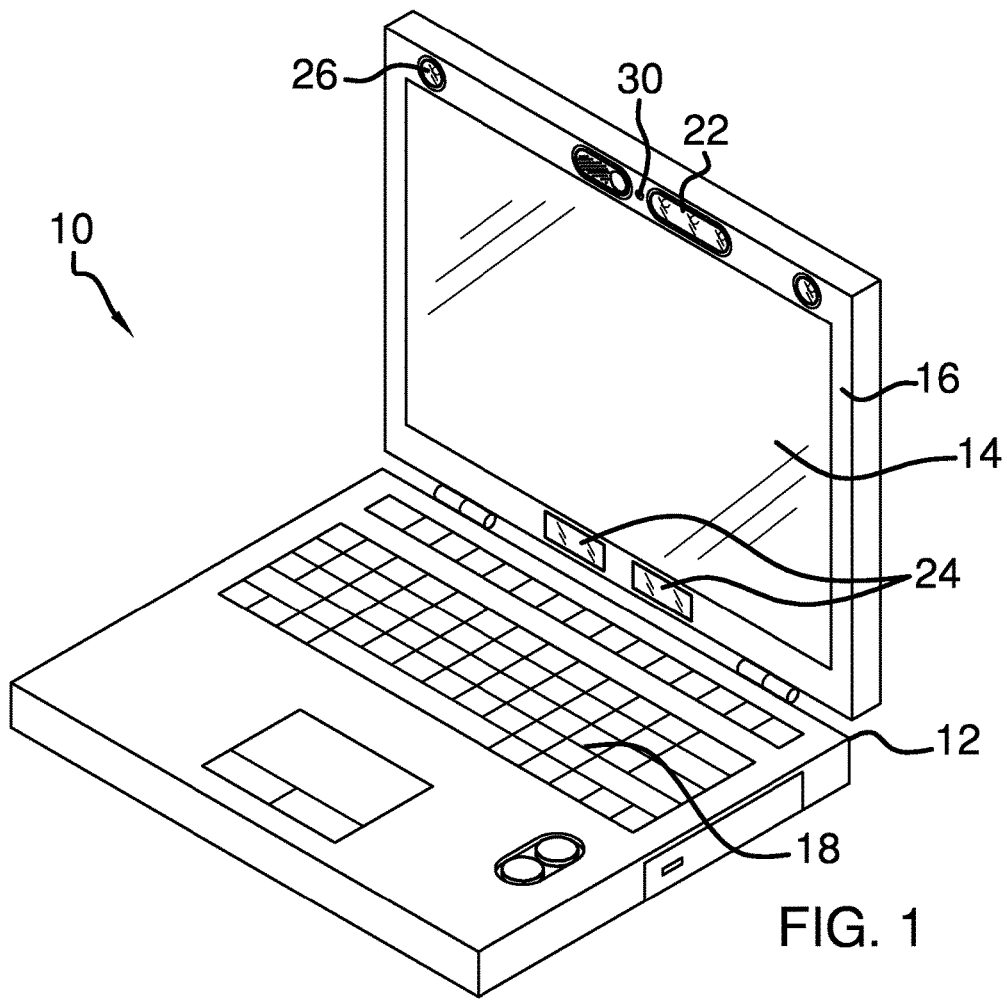
FIG. 1 is a front perspective view of a computer message indicator according to an embodiment of the disclosure.
Figure 2:
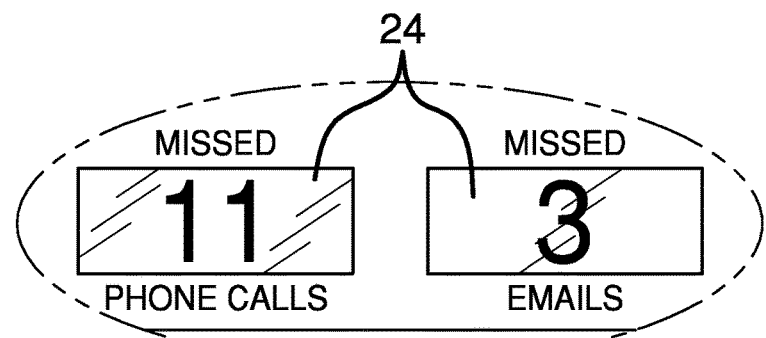
FIG. 2 is a front view of an embodiment of the disclosure.
Figure 3:
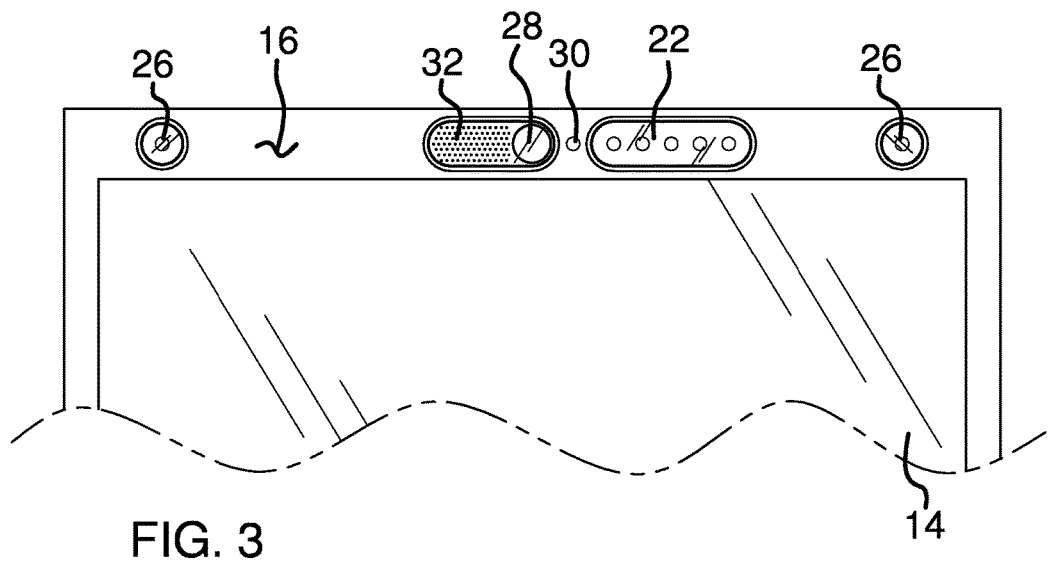
FIG. 3 is a front view of an embodiment of the disclosure.
Figure 4:
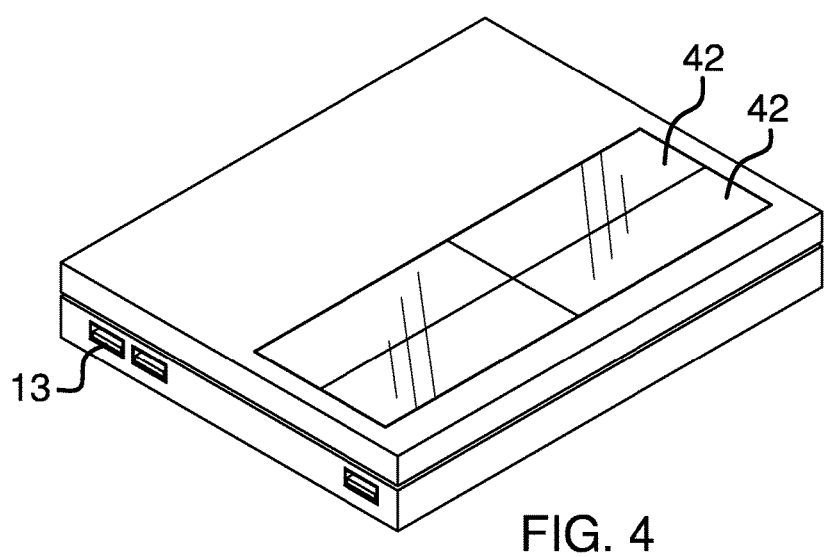
FIG. 4 is a rear perspective view of an embodiment of the disclosure.
Figure 5:
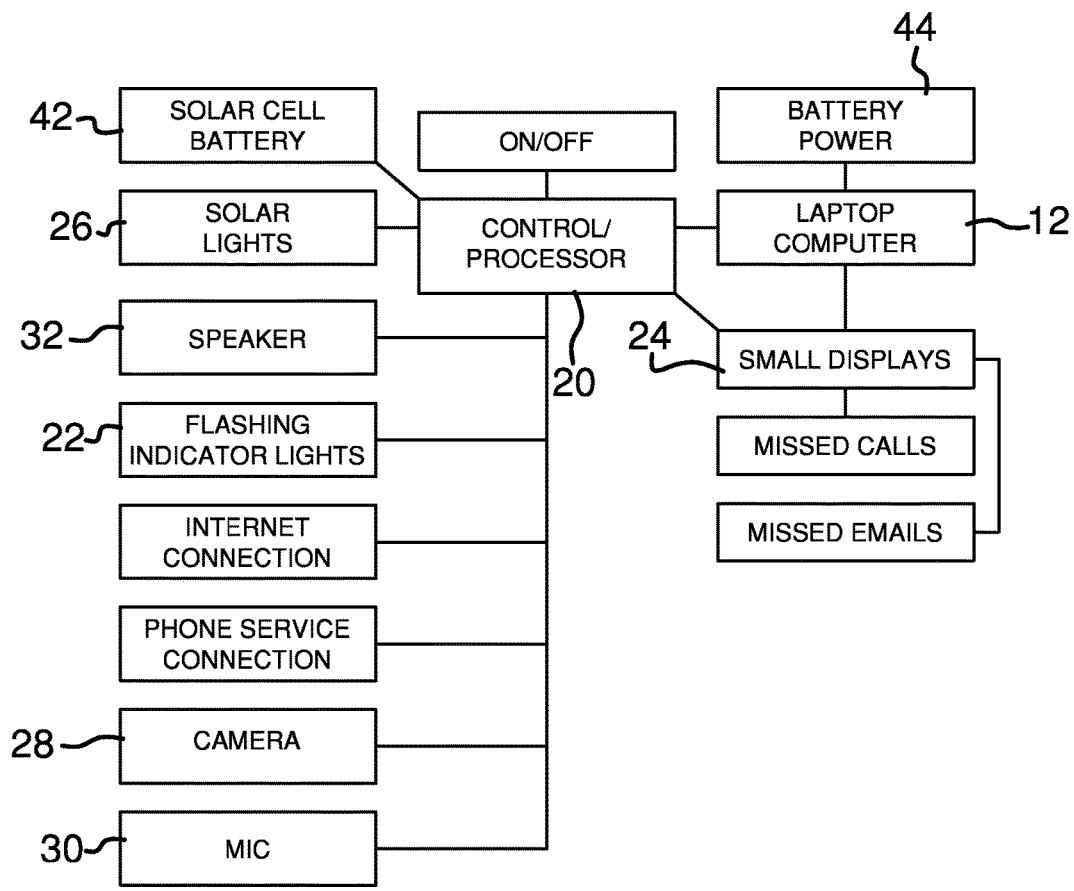
FIG. 5 is a schematic view of an embodiment of the disclosure.

With reference now to the drawings, and in particular to FIGS. 1 through 6 thereof, a new message signaling device embodying the principles and concepts of an embodiment of the disclosure and generally designated by the reference numeral 10 will be described.

As best illustrated in FIGS. 1 through 6, the computer message indicator 10 generally comprises a conventional laptop computer 12 including a screen 14 for displaying images which is attached to a housing containing a keyboard 16. The screen 12 is bounded by a perimeter wall 18.

A control 20 is in communication with the computer 12 and may be mounted on or in the computer 12. The control 20 may be a separate control circuit or processor, or it may be a processor of the computer 12 itself. A signal light 22 is electrically coupled to the control 20 and is mounted to the perimeter wall 18 of the display 14. The control 20 is signaled by the computer 12 when the computer 12 receives a message signal from the computer 12. The control 20 is programmed to turn on the signal light 22 when the control 20 receives the message signal. The message signal is generated when the computer 12 receives typical messages such as an incoming email, a video call, or an audio call. When the signal light 22 is turned on, it will allow persons having limited hearing to visually be signaled that a message has been received.

A display 24 is electrically coupled to the control 20. The display 20 is mounted on the perimeter wall 16 and the control is programmed to display a total number of the message signals received by the control 20. The total number of the messages may be re-set upon actuation of the computer 12. The display 24 is separate from the screen 14 and may comprise multiple displays 24 which in turn may include LED, LCD or other conventional displays. Thus, one display 24 may count emails received while the other may count missed video or audio calls.

A light emitter 26 is electrically coupled to the control 20 and is mounted on the perimeter wall 16. A camera 28 is electrically coupled to the control 20 and is also mounted on the perimeter wall 16. Further, a microphone 30 and speaker 32 are also each electrically coupled to the control 20 and mounted on the perimeter wall 16. The speaker 32, the microphone 30, light emitter 26 and the camera 28 may be actuated, simultaneously or individually, to an active condition to facilitate audio and video conferencing through the control 20 and the computer 12 and will receive and send audio and video data through computer 12. The computer 12 in turn will be in communication with the internet by wired or wireless connections. Alternatively, the connection may be through a telephone service provider.

Figure 6:
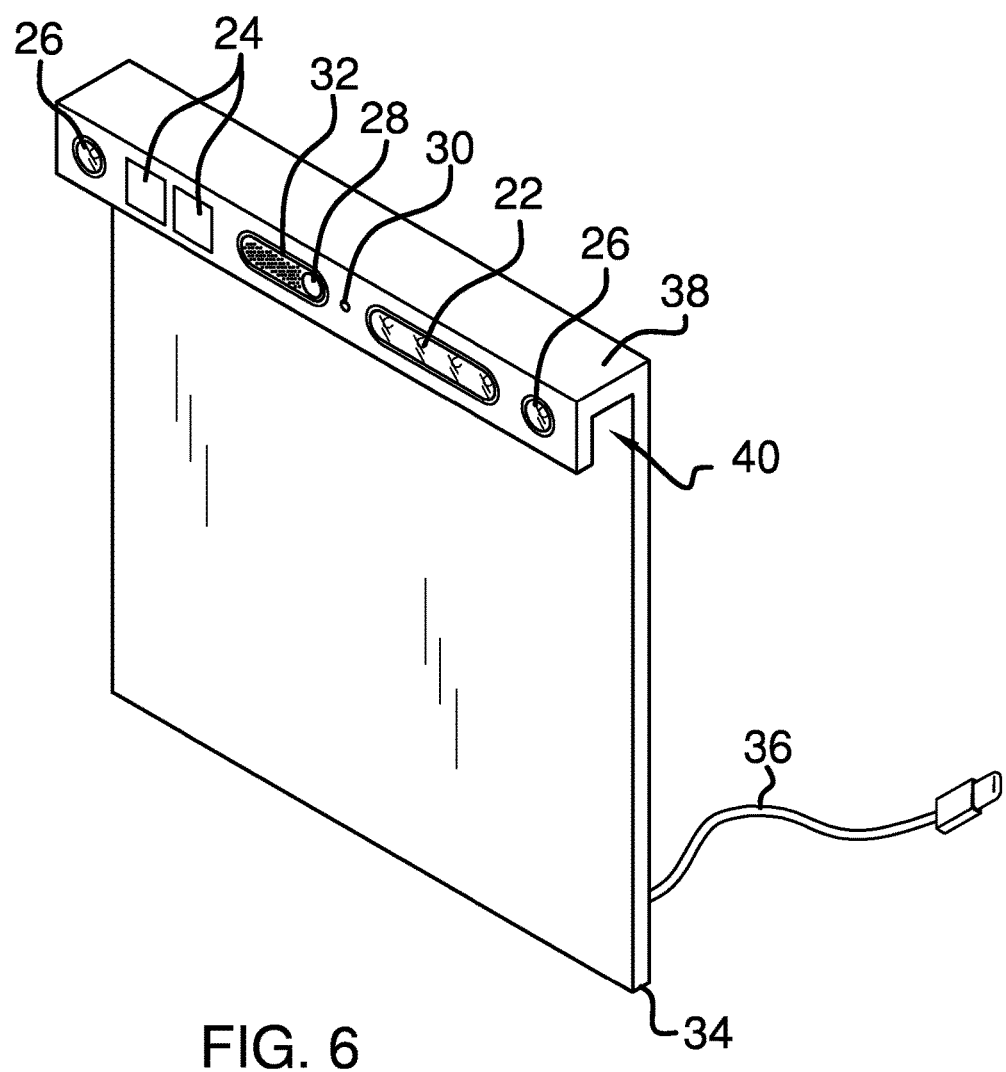
FIG. 6 is a front perspective view of an embodiment of the disclosure.

As can be seen in FIG. 6, the indicator 10 may comprise a mount 34 that is removably mounted on the perimeter wall 16 of the computer 12. The control 20, signal light 22, display 24, light emitter 26, camera 28, microphone 30 and the speaker 32 are each positioned on and non-removably attached to the mount 34. The control 20 may be electrically coupled to computer 12 by way of a data cord 36 coupled to one of the data ports 13 of the computer 12, or a docking mount may be utilized for such purposes. The mount 34 includes a shoulder 38 having a notch 40 therein for receiving an upper edge of the area bounding the screen 14 of the computer 12 and thus allows the mount 34 to rest on the computer 12.

A plurality of photovoltaic cells 42 may be electrically coupled to the control 20. This may be particularly useful where the mount 34 includes its own auxiliary battery which may be recharged with the photovoltaic cells 42. The computer may thus also utilize a battery in the mount 34 or recharge the computer battery 44. In particular the photovoltaic cells 42 may be used with the light emitters 26 which may comprise solar lights having internal rechargeable batteries.

In use, the computer 12 is used in a generally conventional manner, however when the computer 12 receives a message, a message signal will be sent to the control 20 which will activate the signal lights 22 to alert a person that they have received a message. The display 24 may be utilized if desired to track the number of messages received.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A message indicating system comprising:
a computer including a screen for displaying images, said screen being bounded by a perimeter wall, said computer comprising a laptop computer;
a control being in communication with said computer;
a signal light being electrically coupled to said control, said signal light being mounted to said perimeter wall of said display, said control being signaled by said computer when said computer receives a message signal from said computer, said control being programmed to turn on said signal light when said control receives said message signal;
said message signal being generated when said computer receives an incoming email, a video call, or an audio call;
a display being electrically coupled to said control, said display being mounted on said perimeter wall, said control being programmed to display a total number of said message signals received by said control, said total number of said messages being re-set upon actuation of said computer;
a light emitter being electrically coupled to said control and being mounted on said perimeter wall;
a camera being electrically coupled to said control;
a microphone being electrically coupled to said control;
a speaker being electrically coupled to said control, wherein said speaker, said microphone, light emitter and said camera are actuated to an active condition to facilitate audio and video conferencing through said control and said computer;
a mount being removably mounted on said perimeter wall, said control, signal light, display, light emitter, camera, microphone and said speaker each being positioned on and non-removably attached to said mount, said mount having a back section, a front section, and a top section coupled to and extending between said front section and said back section, said front section and said back section defining a notch therebetween, said notch receiving a top edge of said perimeter wall wherein said mount is positionable on said computer such that said top section rests on said top edge of said perimeter wall such that said front section overhangs from said top edge of said perimeter wall adjacent to said screen; and
a plurality of photovoltaic cells being electrically coupled to said control.

* * * * *